United States Patent [19]
Zarek

[11] Patent Number: 5,951,179
[45] Date of Patent: Sep. 14, 1999

[54] METHOD OF OPERATING A COMPUTER KEYBOARD ASSEMBLY

[75] Inventor: Lynne Zarek, Boise, Id.

[73] Assignee: Micron Electronics, Inc., Nampa, Id.

[21] Appl. No.: 09/044,386

[22] Filed: Mar. 18, 1998

[51] Int. Cl.⁶ ........................................... B41J 5/08
[52] U.S. Cl. .............................. 400/492; 400/472
[58] Field of Search ........................... 400/492, 472, 400/473, 477, 479, 488, 489; 341/21, 22; 248/118, 118.1, 118.3; 312/208.1, 208.4

[56] References Cited

U.S. PATENT DOCUMENTS

| | | | |
|---|---|---|---|
| 4,765,583 | 8/1988 | Tenner | 248/444 |
| 4,852,498 | 8/1989 | Judd | 108/43 |
| 5,073,050 | 12/1991 | Andrews | 400/489 |
| 5,187,644 | 2/1993 | Crisan | 361/393 |
| 5,502,460 | 3/1996 | Bowen | 345/168 |
| 5,504,500 | 4/1996 | Garthwaite et al. | 345/157 |
| 5,519,569 | 5/1996 | Sellers | 361/680 |
| 5,527,116 | 6/1996 | Huellmeier et al. | 400/82 |
| 5,541,593 | 7/1996 | Arsem | 400/472 |
| 5,564,844 | 10/1996 | Patterson et al. | 400/492 |
| 5,644,338 | 7/1997 | Bowen | 345/168 |
| 5,648,772 | 7/1997 | Friedrich et al. | 341/22 |
| 5,743,666 | 4/1998 | VanZeeland et al. | 400/492 |

FOREIGN PATENT DOCUMENTS

| | | | |
|---|---|---|---|
| 674963 | 8/1990 | Switzerland | 400/715 |

OTHER PUBLICATIONS

RCA Remote Model No. RTB 100, Top Isometric View.
RCA Remote Model No. RTB100, Bottom Isometric View.
Sejin Electron Inc., SWK–5697WT, Top Isometric View.
Sejin Electron Inc., SWK–5697WT, Bottom Isometric View.
SONY Playstation, Top Isometric View.

*Primary Examiner*—Edgar Burr
*Assistant Examiner*—Anthony H. Nguyen
*Attorney, Agent, or Firm*—Seed and Berry, LLP

[57] ABSTRACT

A method of operating a keyboard assembly for a personal computer. In one embodiment, the keyboard assembly has a housing and an actuator coupled to the housing. The housing may have an elongated front edge, an elongated rear edge, a lower surface, and an upper surface. A plurality of keys may project from the upper surface of the housing. The actuator is coupled to the housing to rotate the housing about a rotational axis for changing the inclination of the housing and the keys during operation. For example, the actuator may continuously rotate the housing about a rotational axis during operation in a manner that causes a computer operator to continuously flex his/her wrists. In another embodiment, the housing may be attached to a separate base that has a bottom surface for resting on a support surface. The base may also have a top surface with a channel extending along the rotational axis that is defined by a curved surface with a circular cross-section. The housing may have a tube or a portion of cylindrical surface depending downward from its lower surface and running longitudinally across its lower surface to fit within the channel of the base. The actuator may be coupled to either the base or the housing to rotate the tube within the channel for changing the inclination of the housing. The actuators for rotating the housing may also have several embodiments. In one particular embodiment, an actuator has a motor attached to either the base or the housing, a shaft rotationally driven by the motor, and a wheel attached by the shaft to engage either the tube or the channel. The rotation of the wheel accordingly causes the housing to rotate with respect to the base.

12 Claims, 5 Drawing Sheets

METHOD OF OPERATING A COMPUTER KEYBOARD ASSEMBLY

TECHNICAL FIELD

The present invention is directed toward methods for operating keyboards for computers. More specifically, several embodiments of the invention are directed toward methods of rotating keyboards about an axis to continuously adjust the inclination of the keyboard.

BACKGROUND OF THE INVENTION

Personal computers are typically small systems that have a processing unit, a display, and several input devices. The display and input devices are coupled to the processing unit, and they often rest on a table or desktop. In most applications, the input devices include a keyboard to transmit alphanumeric commands to the processor and another input device (e.g., a mouse, track-ball or joystick) to control items shown on the display. In operation, keys on the keyboard are selectively pressed to input data or otherwise send commands to the processor.

One problem with operating conventional keyboards is that many people experience fatigue or discomfort in their arms, wrists, and hands. Many people, such as word processors, secretaries, data input personnel, computer programmers, and other computer operators, spend a significant amount of time operating keyboards. Moreover, many people operate keyboards with their arms, hands and wrists in a relatively fixed, unnatural position that induces strain in the muscles and tendons associated with their wrists. As such, a significant number of people experience fatigue or discomfort while operating conventional keyboards. In extreme cases, some people develop carpal tunnel syndrome.

To reduce such fatigue and discomfort, many ergonomic keyboards have been developed with various shapes and keypads. For example, instead of a rectilinear keyboard, many ergonomic keyboards are non-linear and have split keypads so that the left-hand keys extend along one axis and the right-hand keys extend along another axis. Additionally, some ergonomic keyboards may also have a convex upper surface with respect to the desktop. Although most people find ergonomic keyboards to be more comfortable than rectilinear keyboards, many people prefer to use conventional rectilinear keyboards with conventional linear keypads because they make fewer mistakes with rectilinear keyboards. Additionally, many people still experience significant discomfort with ergonomic keyboards because muscle strain may still build over long periods of time causing fatigue or even carpal tunnel syndrome. Therefore, conventional rectilinear keyboards and even ergonomic keyboards may not be comfortable to use for significant periods of time.

SUMMARY OF THE INVENTION

The present invention is directed toward methods of operating keyboard assemblies for personal computers. In one embodiment, a keyboard assembly has a housing and an actuator coupled to the housing. The housing may have an elongated front edge, an elongated rear edge, a lower surface, and an upper surface. The upper and lower surfaces extend between the front and rear edges, and a plurality of keys may project from the upper surface of the housing. The actuator is coupled to the housing to rotate the housing about a rotational axis for changing the inclination of the housing and the keys during operation. For example, the actuator may continuously rotate the housing about a rotational axis during operation in a manner that causes a computer operator to continuously flex his/her wrists.

Keyboard assemblies used in methods in accordance with the invention may have many different embodiments. For example, the housing may be attached to a separate base that has a bottom surface for resting on a support surface. The base may also have a top surface with a channel extending along the rotational axis that is defined by a curved surface with a circular cross-section. The housing may have a tube or a portion of cylindrical surface depending downward from its lower surface and running longitudinally across its lower surface to fit within the channel of the base. The actuator may be coupled to either the base or the housing to rotate the tube within the channel for changing the inclination of the housing.

The actuators for rotating the housing may also have several embodiments. In one particular embodiment, an actuator has a motor attached to either the base or the housing, a shaft rotationally driven by the motor, and a wheel attached by the shaft to engage either the tube or the channel. The rotation of the wheel accordingly causes the housing to rotate with respect to the base. In another embodiment, the cylindrical surface of the housing has a row of teeth, and a gear is attached to the shaft of the motor to engage the teeth on the housing. The rotation of the gear accordingly rotates the housing with respect to the base. In still another embodiment, the actuator is a linear actuator attached to the rear portion of the base and the housing. The linear actuator may have a rod that moves between an extended position and a contracted position to rotate the housing about the rotational axis.

DETAILED DESCRIPTION OF THE INVENTION

The present invention is directed toward methods of operating keyboard assemblies for personal computers. In some particular embodiments, an actuator continuously rotates a keyboard housing about an axis to slowly change the inclination of the keyboard during operation. Many specific details of certain embodiments of the invention are set forth in the following description and in FIGS. 1–6 to provide a thorough understanding of such embodiments. One skilled in the art, however, will understand that the present invention may have additional embodiments that may be practiced without several of the details described in the following description.

Figure 1:
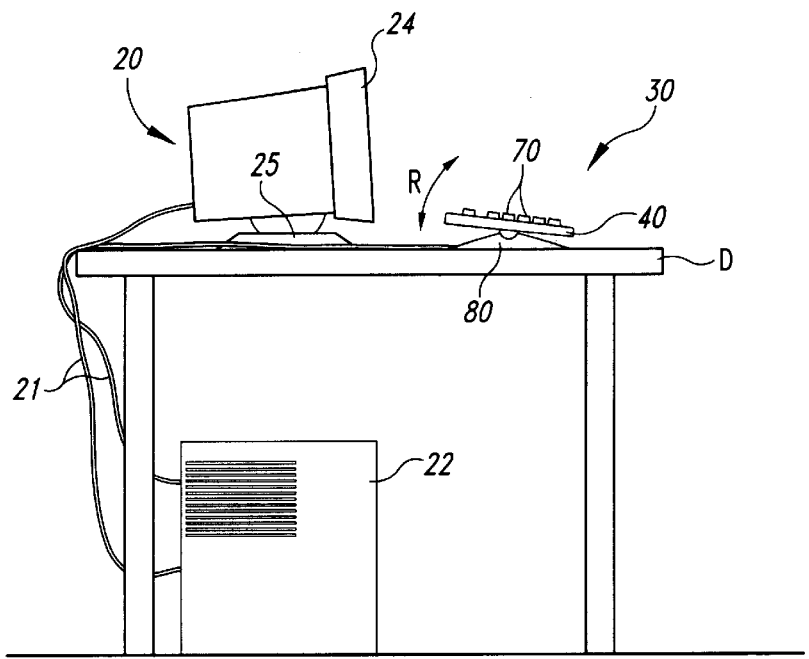
FIG. 1 is a side elevational view of a computer system with a keyboard assembly used in a method in accordance with one embodiment of the invention.

FIG. 1 is a side elevational view of a computer system 20 having a processing unit 22 coupled to both a display 24 and a keyboard assembly 30 via cables 21. The display 24 may have a footing 25 to rest on a flat work surface, such as a table or desk "D." As explained in greater detail below, the keyboard assembly 30 has a keyboard housing 40 carrying a plurality of input keys 70 and a base 80 pivotally attached to the keyboard housing 40. A second input device (not shown), such as a mouse or joystick, may also be coupled to the processing unit 22. As set forth below, an actuator (not shown in FIG. 1) rotates the keyboard housing 40 (arrow R) about a rotational axis to slowly change the inclination of the keyboard housing 40 during operation.

Figure 2:
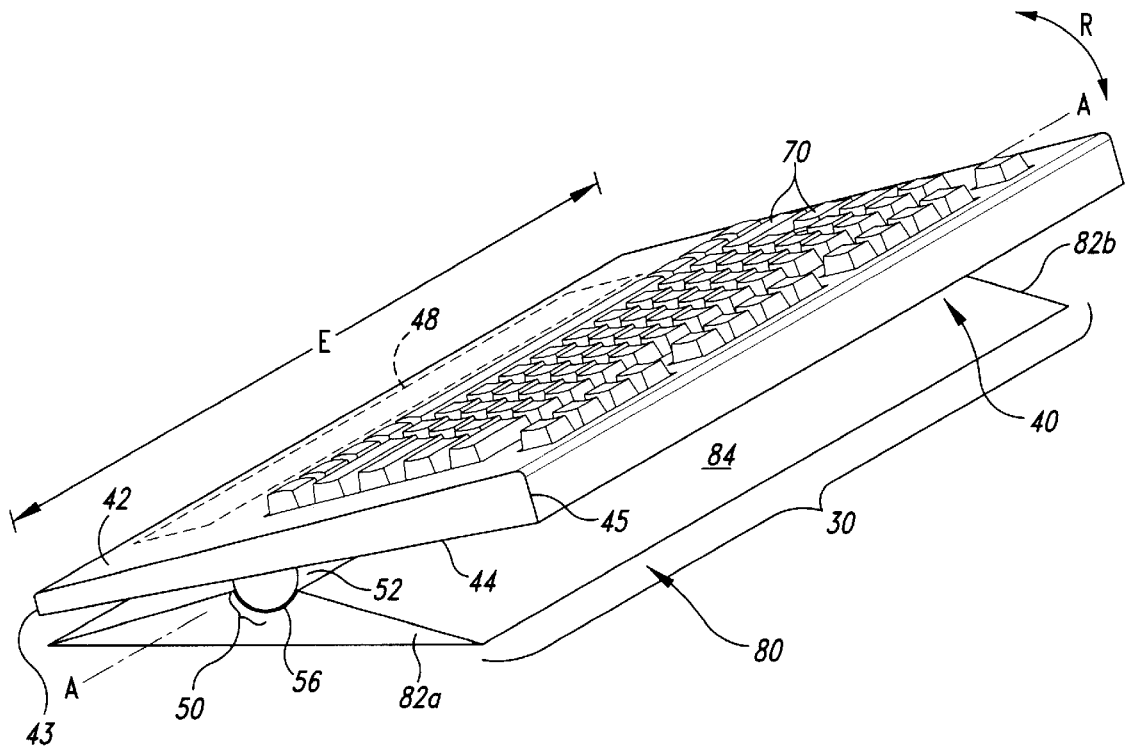
FIG. 2 is an isometric view of an embodiment of the keyboard assembly shown in FIG. 1.

FIG. 2 is an isometric view illustrating one embodiment of the keyboard assembly 30 in greater detail. In this embodiment, the keyboard housing 40 has an upper surface 42, a lower surface 44 facing the base 80, a front edge 43 facing a user (not shown), and a rear edge 45. The front and rear edges 43, 45 extend generally along an elongated dimension "E." The input keys 70 project upward from the upper surface 42, and they may be configured in the standard QWERTY key pattern. Additionally, the housing 40 may have a large forward region 48 between the front edge 43 and the keys 70 for supporting the palms of a user's hands (not shown) during operation. The forward region 48, for example, may have a width between 1.0 and 5.0 inches transverse to the elongated dimension.

The keyboard assembly 30 may also have a joint or hinge 50 to couple the keyboard housing 40 to the base 80. In this particular embodiment, the joint 50 has a tube or cylindrical surface 52 depending from the lower surface 44 of the keyboard housing 40 and a curved channel 56 in the top of the base 80. The cylindrical surface 52 and the channel 56 extend longitudinally approximately parallel to the lower surface 44 along a rotational axis A—A. In this embodiment, the channel 56 has a circular cross-section configured to receive the cylindrical surface 52 so that the keyboard housing 40 can rotate with respect to the base 80 about the rotational axis A—A. Instead of the particular joint 50 shown in FIG. 2, other joints may be used that allow the keyboard assembly 40 to rotate with respect to the base 80 along the rotational axis A—A. Also, as explained in more detail in FIGS. 3A–3E, an actuator or driving assembly coupled to the keyboard housing 40 rotates the keyboard housing 40 (arrow R) to change the inclination of the keyboard housing 40 and the input keys 70 during operation.

Figure 3A:
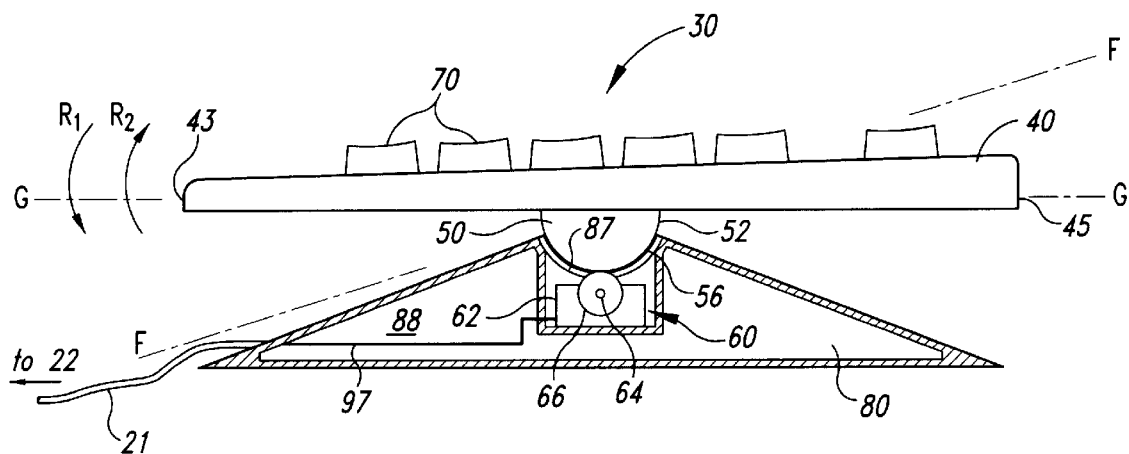
FIG. 3A is a cross-sectional view of the keyboard assembly of FIG. 2 with an actuator used in a method in accordance with one embodiment of the invention.

FIG. 3A is a partial cross-sectional view illustrating an embodiment of the keyboard assembly 30 with a rotational actuator or drive assembly 60. The drive assembly 60 may have a motor or rotational actuator 62, a drive shaft 64 driven by the motor 62, and a wheel 66 attached to the drive shaft 64. The motor 62 may be attached to the base 80 in a cavity 88 below the keyboard housing 40, and an opening or slot 87 in the base 80 provides access to the cylindrical surface 52 to allow the wheel 66 to engage the cylindrical surface 52 of the joint 50.

The motor 62, for example, may be an electric servo motor that rotates the wheel 66 in a clockwise direction and then in a counter-clockwise direction. When the motor 62 rotates the wheel 66 clockwise, the front edge 43 of the keyboard housing 40 rotates downward (arrow $R_1$). Conversely, when the motor 62 rotates the wheel 66 counterclockwise, the front edge 43 of the keyboard housing 40 rotates upward (arrow $R_2$). The rotational velocity and the number of rotations of the wheel 66 in both the clockwise and the counterclockwise directions may be adjusted to set the distance and the rotational velocity that the keyboard housing 40 rotates with respect to the base 80. For example, the motor 62 may rotate the keyboard housing 40 to cycle between a forward-most position (line F—F) and a rearmost position (line G—G) approximately every 5–30 minutes.

Figure 3B:
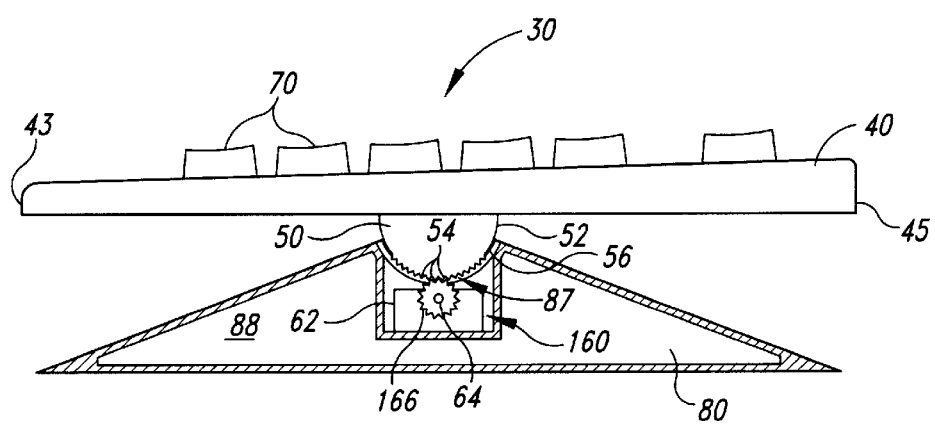
FIG. 3B is a cross-sectional view of the keyboard assembly of FIG. 2 with another actuator used in a method in accordance with another embodiment of the invention.

FIGS. 3B–3E are cross-sectional views of the keyboard assembly 30 illustrating other embodiments of drive assemblies for rotating the keyboard housing 40 with respect to the base 80. FIG. 3B illustrates a rotational drive assembly 160 in which a gear 166 is attached to the drive shaft 64. Additionally, the cylindrical surface 52 of the joint 50 has a plurality of teeth 54 to mate with teeth of the gear 166. The teeth 54 on the cylindrical surface 52 may be arranged in a row or track, and the teeth 54 may extend through the slot 87 in the base 80. Additionally, the teeth 54 may extend only along a portion of the length of the cylindrical surface 52 so that the rest of the cylindrical surface 52 engages the channel 56. As set forth above with reference to FIG. 3A, the motor 62 rotates the gear 166 clockwise and counter-clockwise to rotate the keyboard housing 40 with respect to the base 80.

Figure 3C:
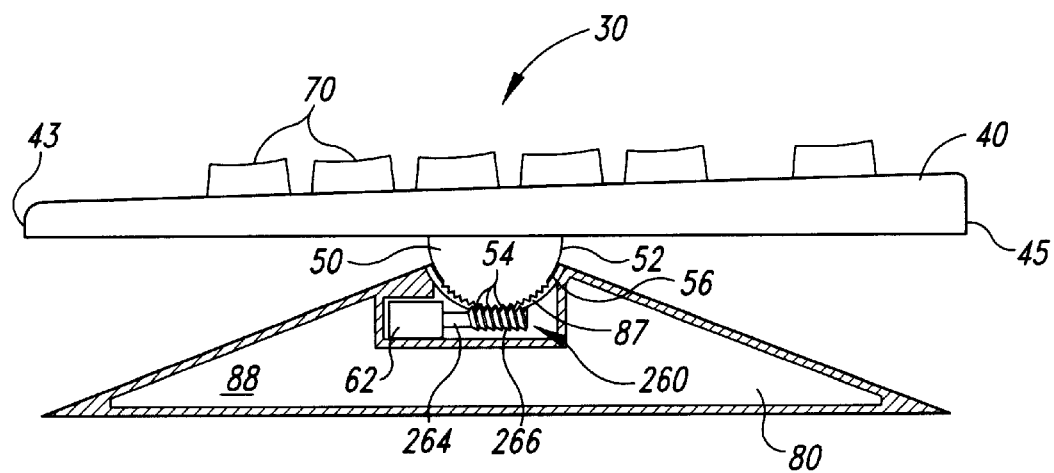
FIG. 3C is a cross-sectional view of the keyboard assembly of FIG. 2 with still another actuator used in a method in accordance with another embodiment of the invention.

FIG. 3C illustrates another drive assembly 260 having a motor 62 and a drive shaft 264 with a worm gear 266. The teeth of the worm gear 266 engage the teeth of the cylindrical surface 52 through the opening 87. The motor 62, therefore, rotates the drive shaft 264 clockwise and counterclockwise to rotate the keyboard housing 40 with respect to the base 80.

Figure 3D:
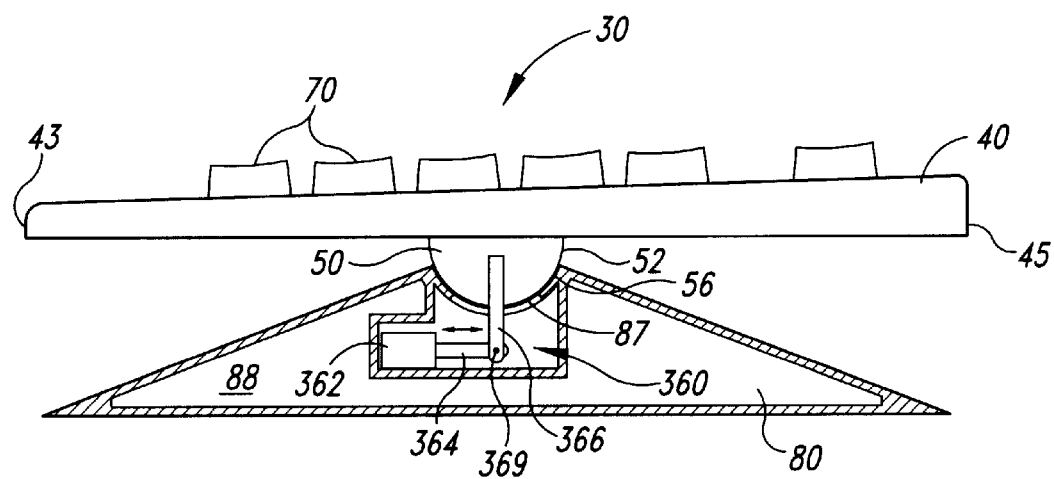
FIG. 3D is a cross-sectional view of the keyboard assembly of FIG. 2 with yet another actuator used in a method in accordance with yet another embodiment of the invention.

FIG. 3D illustrates the keyboard assembly 30 with a linear drive assembly 360 that has a linear actuator 362, a rod 364 driven by the actuator 362, and a link 366 fixedly attached to the cylindrical surface 52 and pivotally attached to the rod 364 via a pin 369. The linear actuator 362 is attached to the base 80, and the actuator 362 drives the rod 364 between an extended position and a contracted position. In operation, the extension and contraction of the rod 364 rotates the keyboard housing 40 in a manner similar to the rotational drive assemblies described above.

Figure 3E:
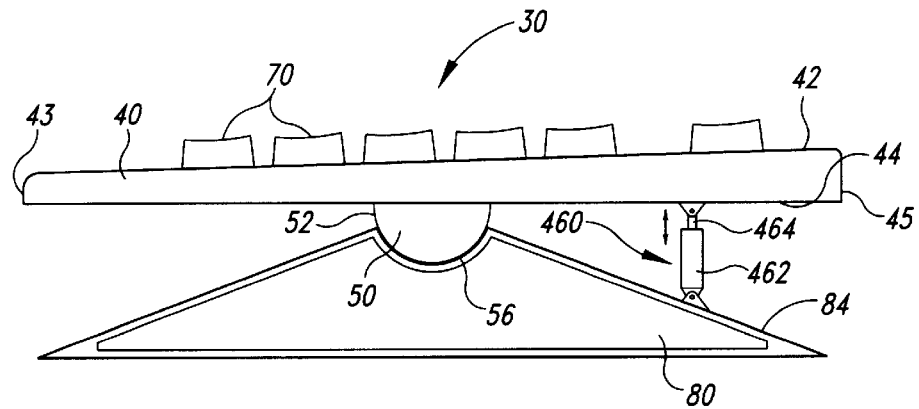
FIG. 3E is a cross-sectional view of the keyboard assembly of FIG. 2 with another actuator used in a method in accordance with another embodiment of the invention.

FIG. 3E illustrates the keyboard assembly 30 with still another linear drive assembly 460 that has a linear actuator 462 and a rod 464 driven by the actuator 462. The actuator 462 is attached to the rear upper surface 84 of the base 80, and the rod 464 is attached to the rear lower surface 44 of the keyboard housing 40. In this embodiment, the rod 464 extends and contracts vertically to rotate the keyboard housing 40 with respect to the base 80.

The drive assemblies 60, 160, 260, 360, 460 and the joint 50 shown and described above are only a few examples of the mechanisms that may be used to rotate or otherwise change the inclination of the keyboard during operation. In other types of drive assemblies, for example, the actuators may be mounted to the cylindrical surface 52 such that the wheels or gears engage the channel 56 of the joint 50. In other joints, for example, the base 80 may have two pins that engage holes in the ends of the keyboard housing 40. Conversely, the keyboard housing 40 may have pins to engage holes or slots in the ends of the base 80. Additionally, the base 80 may have many other shapes instead of the pyramidal shape illustrated in FIGS. 1–3E.

Figure 4:
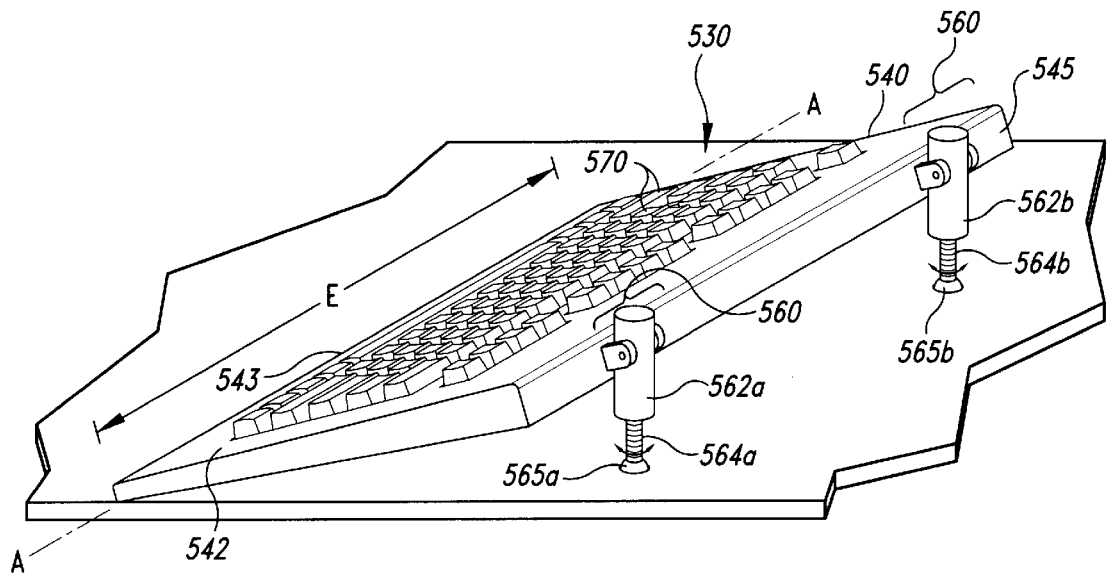
FIG. 4 is an isometric view of another keyboard assembly used in a method in accordance with another embodiment of the invention.

FIG. 4 is an isometric view of another keyboard assembly 530 in accordance with another embodiment of the invention. The keyboard assembly 530 has a keyboard housing 540 with a front edge 543 and a rear edge 545 extending generally along an elongated dimension "E." The keyboard housing 540 also carries a plurality of keys 570 that may be arranged in a conventional configuration for either a rectilinear or a shaped keyboard. In this embodiment, the keyboard assembly 530 has a drive assembly 560 with a plurality of linear actuators 562 (indicated by reference numbers 562a and 562b) that each have a rod 564 (indicated reference numbers 564a and 564b). The liner actuators 562 may be pivotally attached to the rear edge 545 of the keyboard housing 540, and the linear actuators 562 may extend and contract the rods 564 to rotate the keyboard housing 540 about a rotational axis A—A proximate to the front edge 543 of the keyboard housing 540.

In one particular embodiment of the keyboard assembly 530, the linear actuators 562 are servo-motors and the rods 564 are threaded shafts in which each rod 564 is threadedly engaged with an actuator 562 and rotatably attached to a footing 565 (indicated by reference numbers 565a and 565b). For example, each rod 564 may be attached to a corresponding footing 565 by a ball joint (not shown). The actuators 562 may accordingly rotate the rods 564 to raise and lower the rear edge 545 for rotating the keyboard housing 540 about the rotational axis A—A.

The drive assemblies described above with reference to FIGS. 3A–4 may be controlled by software in the processing unit 22 (FIG. 1). For example, referring to FIG. 3A, the servo-motor 62 may be coupled to the processing unit 22 via a line 97 in the cable 21. Additionally, a control program operated by the processing unit 22 may allow the operator to select the amplitude and velocity that the servo-motor 62 rotates the keyboard housing 40 with respect to the base 80. Control programs for adjusting the servo-motor 62 may be similar to programs for controlling joysticks, keyboards, mouses and track-ball input devices. A person skilled in the art, therefore, may readily develop suitable control programs for adjusting the servo-motor 62.

The drive assemblies described above with reference to FIGS. 3A–4 may also be controlled by hardware in the keyboard assemblies. For example, referring to FIG. 3C, first and second controls 98 and 99 may be connected to hardware in the servo-motor 62 to control the velocity and the amplitude that the servo-motor 62 rotates the keyboard housing 40 with respect to the base 80. Suitable reversible servo-motors with velocity and distance controls are commercially available, and thus selecting the appropriate servomotors is within the skill of an person skilled in the art.

Several embodiments of keyboard assemblies in accordance with the invention are expected to reduce fatigue and muscle strain caused by operating computer keyboards. The keyboard assemblies 30 and 530 shown in FIGS. 1–4, for example, continuously rotate the keyboard housings about a rotational axis during operation causing computer operators to flex their wrists as they type. By flexing their wrists, the operators are not as likely to experience cramps or fatigue because their arms, wrists and hands are not fixed in a single position for a long period of time. Therefore, many keyboard assemblies in accordance with the invention are expected to reduce fatigue and muscle strain for prolonged use of computer keyboards. Many keyboard assemblies in accordance with the invention, in fact, may even reduce the occurrence of carpal tunnel syndrome.

Figure 5:
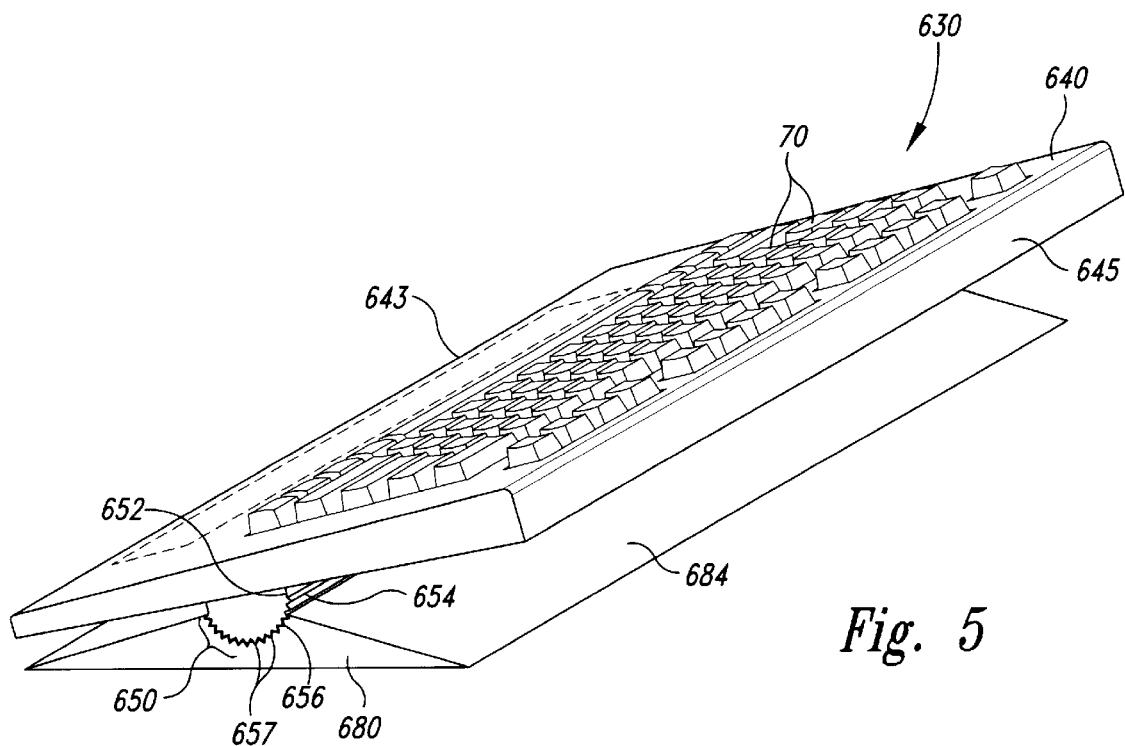
FIG. 5 is an isometric view of still another keyboard assembly used in a method in accordance with still another embodiment of the invention.

FIG. 5 illustrates still another keyboard assembly 630 that has a keyboard housing 640 and a base 680. The keyboard assembly 630 is a passive device in which the operator manually rotates the keyboard housing 640 with respect to the base 680. In this embodiment, the joint 650 has also a cylindrical surface 652 with a plurality of teeth 654 extending along the keyboard housing 540 and a curved surface 656 with a plurality of teeth 657 extending along the base 680. The teeth 654 of the cylindrical surface 652 engage the teeth 657 of the curved surface 656 to prevent the keyboard housing 640 from rotating with respect to the base 680. In operation, the keyboard housing 640 is manually lifted and rotated with respect to the base 680 to change the inclination of the keyboard housing 640 to a different position. In another embodiment (not shown), a timer with an audible tone may be programmed in the computer to remind the computer operator to rotate the keyboard housing 640.

Figure 6:
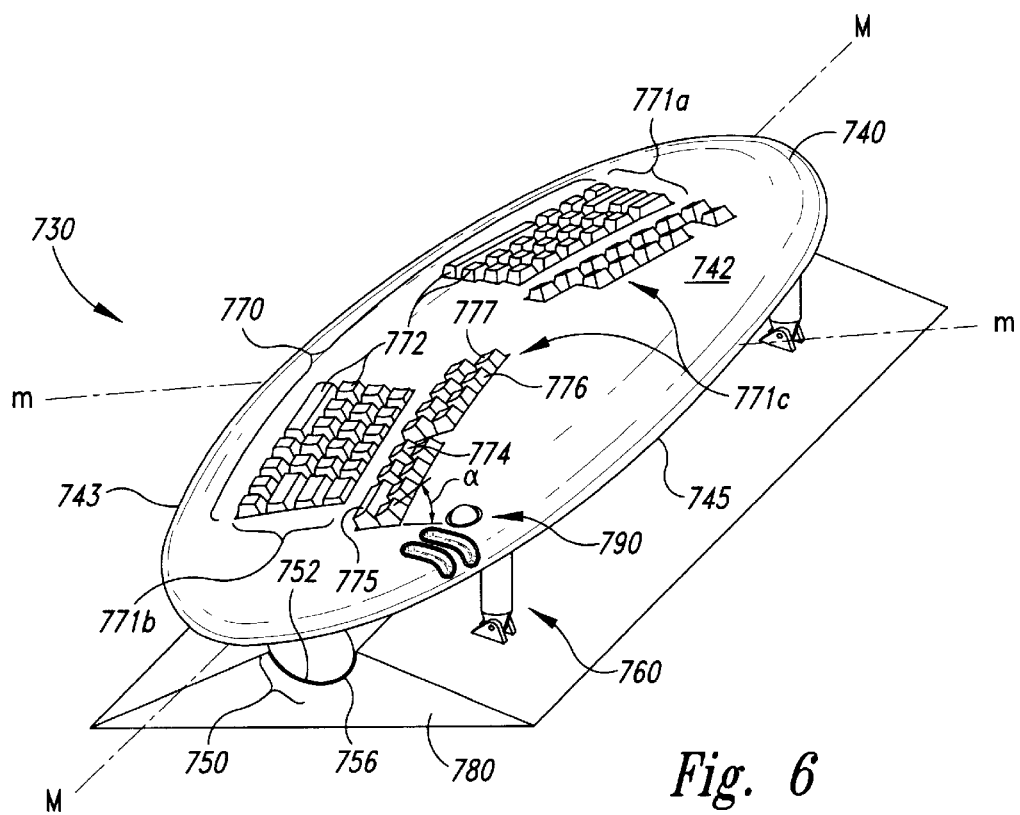
FIG. 6 is an isometric view of yet another keyboard assembly used in a method in accordance with yet another embodiment of the invention.

FIG. 6 is an isometric view of another keyboard assembly 730 in accordance with another embodiment of the invention. The keyboard assembly 730 has an ergonomic keyboard housing 740 with a shape selected to enhance the ergonomics of the keyboard. For example, the keyboard housing 740 may have a rounded top surface 742, a curved front edge 743 and a curved rear edge 745. The front and rear edges 743, 745 may define an oval shape having a major axis M—M and a minor axis m—m. Additionally the keys 770 may be divided into a left-hand keypad 771a, a right hand keypad 771b, and number/function keypads 771c. The left-hand and right-hand keypads 771a and 771b may have the left-hand and right-hand keys 772 associated with left-hand and right-hand keys of a conventional keypad. Additionally, the number/function keypads 771c have number keys 774 with slanted faces 775 and function keys 776 with slanted faces 777. The slanted faces 775, 777 are inclined to slope downward towards the front edge 743. The angle of inclination α is selected according the amount that the keyboard housing 740 rotates rearward with respect to the base 780. The keyboard assembly 730 may also have track-ball assembly 790 in the upper surface 742 toward the rear edge 745.

A drive assembly 760 similar to the linear drive assembly 460 described above with reference to FIG. 3E may be attached to the base 780 and the keyboard housing 740. In operation, therefore, the drive assembly 760 may extend and contract to rotate the keyboard housing 740 with respect to the base 780 to change the inclination of the keys 770 while an operator types. Compared to other keyboards in which the number and function keys do not have slanted faces, the keyboard assembly 730 is expected to be easier to operate because the slanted faces 775, 777 of the number and function keys 774, 776 should make it easier to depress these keys when the keyboard housing 740 rotates rearward with respect to the base 780. The slanted faces 775, 777, in fact, may make the number and function keys 774, 776 easier to operation in any rotational position of the keyboard housing 740.

From the foregoing it will be appreciated that, although specific embodiments of the invention have been described herein for purposes of illustration, various modifications may be made without deviating from the spirit and scope of the invention. An ergonomic keyboard, for example, may have a base with any of the drive assemblies shown or described above. Accordingly, the invention is not limited except as by the appended claims.

I claim:

1. A method of operating a keyboard, comprising:
   providing a housing having a plurality of keys and a cylindrical surface concentric with a rotational axis;
   rotating the housing about the rotational axis to change an angle of the housing with respect to a user by driving a wheel against the cylindrical surface of the housing clockwise to pivot the housing with respect to a base about the rotational axis in a forward direction to a forward position and counter-clockwise to reverse pivot the housing with respect to the base about the rotational axis in a rearward direction to a rearward position; and depressing selected keys as the housing rotates.

2. A method of operating a keyboard, comprising:

providing a housing having a plurality of keys, a cylindrical surface concentric with a rotational axis, and a row of teeth on the cylindrical surface;

rotating the housing about the rotational axis to change an angle of the housing with respect to a user by driving a gear against the row of teeth on the cylindrical surface of the housing clockwise to pivot the housing with respect to a base about the rotational axis in a forward direction to a forward position and counter-clockwise to reverse pivot the housing with respect to the base about the rotational axis in a rearward direction to a rearward position; and depressing selected keys as the housing rotates.

3. A method of operating a keyboard, comprising:

providing a housing having a plurality of keys and a driving wheel;

providing a base having a curved surface concentric with a rotational axis;

rotating the housing about the rotational axis to change an angle of the housing with respect to a user by driving the wheel against the curved surface of the base to drive the housing clockwise to pivot the housing with respect to the base about the rotational axis in a forward direction to a forward position and counter-clockwise to reverse pivot the housing with respect to the base about the rotational axis in a rearward direction; and depressing selected keys as the housing rotates to a rearward position.

4. A method of operating a keyboard, comprising:

providing a housing having a plurality of keys and a gear;

providing a base having a curved surface concentric with a rotational axis and a row of teeth on the curved surface;

rotating the housing about the rotational axis to change an angle of the housing with respect to a user by driving the gear against the row of teeth on the curved surface of the base clockwise to pivot the housing with respect to the base about the rotational axis in a forward direction to a forward position and counter-clockwise to reverse pivot the housing with respect to the base about the rotational axis in a rearward direction to a rearward position; and depressing selected keys as the housing rotates.

5. A method of operating a keyboard, comprising:

providing a housing having a plurality of keys;

providing a base;

providing a linear actuator coupled to the housing and the base;

rotating the housing about a rotational axis to change an angle of the housing with respect to a user by extending and contracting the linear actuator coupled to the housing and the base to pivot the housing with respect to the base about the rotational axis in a forward direction to a forward position and to reverse pivot the housing with respect to the base in a rearward direction to a rearward position; and depressing selected keys as the housing rotates.

6. A method of operating a keyboard, comprising:

providing a housing carrying a plurality of keys;

proving a linear actuator coupled to the housing and engaging a support surface;

rotating the housing about a rotational axis to change an angle of the housing with respect to a user by extending and contracting the linear actuator coupled to the housing and engaging the support surface to pivot the housing with respect to a base about the rotational axis in a forward direction to a forward position and to reverse pivot the housing with respect to the base in a rearward direction to a rearward position; and depressing selected keys as the housing rotates.

7. A method of operating a computer, comprising:

providing a keyboard having a plurality of keys and a cylindrical surface concentric with a rotational axis; and moving the keyboard about the rotational axis to change an angle of the keyboard with respect to a user by driving a wheel against the cylindrical surface of the keyboard clockwise to rotate the keyboard with respect to a base about the rotational axis in a forward direction to a forward position and counter-clockwise to reverse rotate the keyboard with respect to the base about the rotational axis in a rearward direction to a rearward position as the user presses selected keys on the keyboard in the operation of the computer.

8. A method of operating a computer, comprising:

providing a keyboard having a plurality of keys, a cylindrical surface concentric with a rotational axis, and a row of teeth on the cylindrical surface; and moving the keyboard about the rotational axis to change an angle of the keyboard with respect to a user by driving a gear against the row of teeth on the cylindrical surface of the keyboard clockwise to rotate the keyboard with respect to a base about the rotational axis in a forward direction to a forward position and counter-clockwise to reverse rotate the keyboard with respect to the base about the rotational axis in a rearward direction to a rearward position as the user presses selected keys on the keyboard in the operation of the computer.

9. A method of operating a computer, comprising:

providing a keyboard having a plurality of keys and a driving wheel;

providing a base having a curved surface concentric with a rotational axis; and moving the keyboard about the rotational axis to change an angle of the keyboard with respect to a user by driving the wheel against the curved surface of the base clockwise to rotate the keyboard with respect to the base about the rotational axis in a forward direction to a forward position and counter-clockwise to reverse rotate the keyboard with respect to the base about the rotational axis in a rearward direction to a rearward position as the user presses selected keys on the keyboard in the operation of the computer.

10. A method of operating a computer, comprising:

providing a housing having a plurality of keys and a gear;

providing a base having a curved surface concentric with a rotational axis and a row of teeth on the curved surface; and moving the keyboard about the rotational axis to change an angle of the keyboard with respect to a user by driving the gear against the row of teeth on the curved surface of the base clockwise to rotate the keyboard with respect to the base about the rotational axis in a forward direction to a forward position and counterclockwise to reverse rotate the keyboard about the rotational axis in a rearward direction to a rearward position as the user presses selected keys on the keyboard in the operation of the computer.

11. A method of operating a computer, comprising:

providing a keyboard having a plurality of keys;

providing a base;

providing a linear actuator coupled to the keyboard and the base; and moving the keyboard about the rotational axis to change an angle of the keyboard with respect to a user by extending and contracting the linear actuator coupled to the keyboard and the base to rotate the keyboard with respect to the base about the rotational axis in a forward direction to a forward position and to reverse rotate the keyboard with respect to the base in a rearward direction to a rearward position as the user presses selected keys on the keyboard in the operation of the computer.

12. A method of operating a computer keyboard, comprising:

providing a keyboard carrying a plurality of keys;

providing a linear actuator coupled to the keyboard and engaging a support surface; and moving the keyboard about the rotational axis to change an angle of the keyboard with respect to a user by extending and contracting the linear actuator coupled to the keyboard and engaging the support surface to rotate the keyboard with respect to the base about the rotational axis in a forward direction to a forward position and to reverse rotate the keyboard with respect to the base in a rearward direction to a rearward position as the user presses selected keys on the keyboard in the operation of the computer.

\* \* \* \* \*